May 22, 1956     L. R. CAMPBELL     2,747,153
SPEED CONTROL SYSTEMS FOR ELECTRIC SEWING MOTORS
Filed March 16, 1955
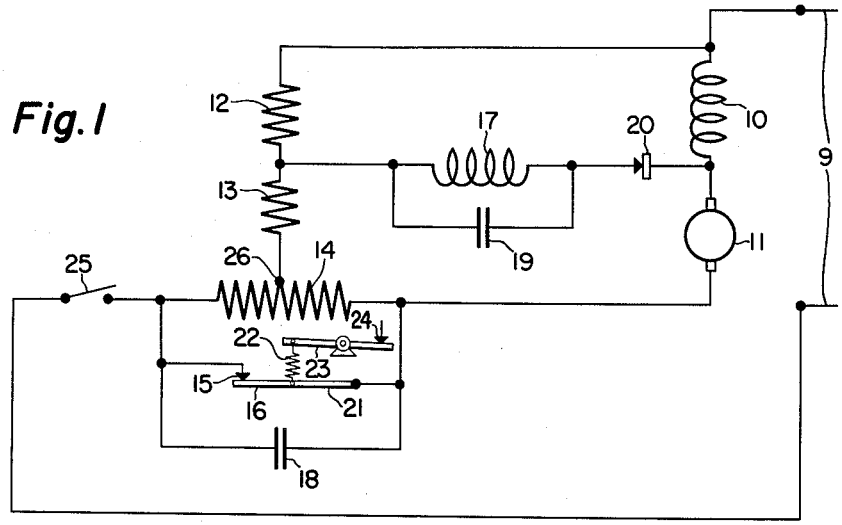
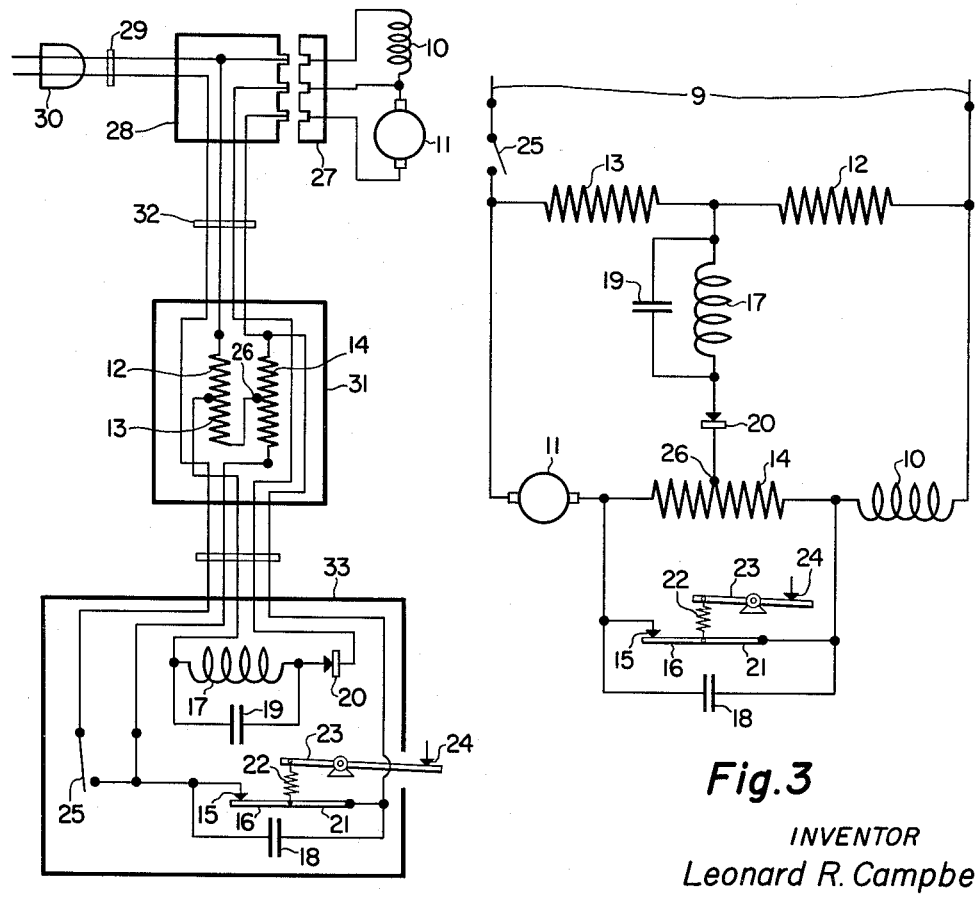
Fig.3
INVENTOR
Leonard R. Campbell
BY *J. J. Stanford*
ATTORNEY
WITNESS
*William Martin*

2,747,153

SPEED CONTROL SYSTEMS FOR ELECTRIC SEWING MOTORS

Leonard R. Campbell, New Brunswick, N. J., assignor to The Singer Manufacturing Company, Elizabeth, N. J., a corporation of New Jersey Application March 16, 1955, Serial No. 494,773

7 Claims. (Cl. 318—331)

This invention relates to speed control systems for electric sewing motors of the series commutator type and more particularly to those systems which employ circuit-making and -breaking devices for varying the voltage applied to the motor in response to the angular speed of the motor rotor.

It is known to use a relay responsive to the back E. M. F. of the armature to open and close a low-impedance circuit around a resistance which is in series between the motor and a source of supply. Such systems have not been fully acceptable because the relay tends to respond to the voltage across the motor terminals rather than to the back E. M. F. of the armature, which latter is the true measure of the motor speed. That is to say, in the prior art relay systems, due to the circuit arrangement, the relay responds more to the relay action per se than to the motor speed and thus behaves more like a buzzer than like a speed regulator, with the result that high contact wear and inaccurate speed control are produced.

It is a primary object of this invention, therefore, to provide a speed control system for electric motors which shall be accurate in its response to speed changes and conservative in its required number of operations per unit time with a resultant long useful life and minimum maintenance.

These and other objects are attained, according to this invention, by a specific circuit arrangement wherein the change in the voltage fed to the relay coil by the closing and opening of the relay contacts is minimized so that the relay responds substantially only to changes in the back E. M. F. of the armature. An A. C. bridge circuit is provided in which the field and armature are bridge elements along with fixed resistors. The relay coil is connected through a rectifier to the output of the bridge which is unbalanced when the armature voltage departs from a predetermined value. A regulating resistance is connected to the bridge circuit so that its presence or absence has little effect per se on the bridge balance.

With the above and other objects in view, as will hereinafter appear, the invention comprises the devices, combinations, and arrangements of parts hereinafter set forth and illustrated in the accompanying drawings of preferred embodiments of the invention, from which the several features of the invention and the advantages attained thereby will be readily understood by those skilled in the art.

In the drawings, Fig. 1 is a schematic diagram showing a circuit for controlling the speed of an electric motor according to this invention.

Fig. 2 is a further diagram of the system of Fig. 1 with a practical placement of parts as would be used in an adaptation of this invention for driving family sewing machines.

Fig. 3 is a modification of the circuit of Fig. 1.

Referring to Fig. 1, a series field winding 10, an armature 11, resistance 12 and resistance 13 form a bridge circuit which is modified by a regulating resistance 14 connected across the contacts 15, 16 of a relay. The operating coil 17 of the relay is connected across the output of the bridge and a single-phase A. C. supply is indicated at 9. Condensers 18, 19 are connected respectively across the contacts 15, 16 to absorb the switching transients and across the relay coil 17 to act as a filter. A dry-disc rectifier 20 is connected in series with the coil 17 to provide a D. C. voltage therefor. The relay armature 21 is normally biased to a closed position by means of a spring 22, the tension in which may be changed by variation in the pressure applied to the lever 23 as indicated by the arrow 24.

Since the relay contacts 15, 16 are normally closed, a switch 25 is used to remove the source voltage from the system except when operation is desired. The switch may conveniently be combined for operation with the lever 23 if desired to provide a simple single control function.

It will be noted that the regulating resistance 14 is tapped at 26 to place it partly within the bridge circuit and partly outside. A tapping point can be found at which the operation of the relay contacts has minimum effect on changing the voltage output of the bridge thus making that voltage change responsive only to the back E. M. F. of the armature, as it should be for accurate speed control. As a matter of fact, the optimum tapping point on the resistance 14 may readily be found by placing a high resistance voltmeter across the relay coil 17 and locking the motor against rotation. Then with normal voltage applied, the relay contacts 15, 16 are mechanically operated while observing the voltmeter. The tapping point is moved until one position is found which gives a minimum voltage change responsive to the contact operation. This will be the optimum point for tapping the resistance.

For a given position of the lever 23 corresponding to a given tension in the spring 22 a predetermined speed will be held by the intermittent action of the relay contacts in a manner well understood in the art. If increased pressure is applied at 24 to increase the tension in the spring, then a higher voltage is necessary across the coil 17 to overcome the increased spring tension. This requires more back E. M. F. from the motor armature which means higher armature rotative speed. Thus the desired speed may be set by the proper pressure at 24 on the lever 23 and, when once set, the speed is regulated at that value by the voltage pulses supplied by the relay action.

A practical embodiment of the invention as applied to the speed control of a family-type sewing machine is shown in Fig. 2 wherein the motor is provided with a three-pin receptacle 27 for engagement with a three-pin plug 28. Connected to the plug 28 by cable 29 is a regular two-prong plug 30 for connection to the regular power outlet. The resistance 14 must be capable of dissipating some 20 watts and the resistances 12 and 13 must handle some 5 watts for the control of the ordinary family sewing motor, and the sizes thus indicated seem somewhat too large to include them within the motor case or the foot controller enclosure. These resistances are therefore preferably provided with their own insulated enclosure 31 which may be a Bakelite box inserted as a series element in the cable 32 running from the three-pin plug to the foot controller 33. In this manner, the foot-controller is kept free of heat-producing elements which might, if used therein, have adverse effects on the calibration of the tension spring 22. With the cabled arrangement of Fig. 2 there is complete interchangeability with the conventional arrangements of the resistance type foot controllers in use today, thus making adaptation in the field an easy matter.

In Fig. 3 is shown a modification of the circuit of Fig. 1 wherein the regulating resistance 14 is included completely in the bridge circuit and is in series between the field 10 and the armature 11. In this case the relay coil circuit with its series rectifier 20 is tapped into the regulating resistance 14 at the point 26, and the optimum position of this tap is found exactly as in the case of the circuit of Fig. 1 described above.

Both circuits provide maximum instantaneous torque by impressing full line voltage on the motor in the closed position of the relay contacts. This insures against stalling and allows the full capabilities of the motor to be developed. At the same time, the tapped regulating resistance in combination with the bridge circuit having motor armature and field windings as bridge elements reduces the frequency of relay operation without detriment to the regulating function and thus promotes a long useful contact life which is of much practical importance in devices of this kind.

Having thus set forth the nature of the invention, what I claim herein is:

1. In an electrical control system, the combination with an electric motor having series-connected armature and field windings, of a tapped regulating resistance for controlling the flow of current to said motor, a relay having contacts which provide an intermittent short-circuit around said regulating resistance, a pair of series-connected resistances forming with said armature and field windings a bridge circuit, said tapped regulating resistance being included at least partly within said bridge circuit and an operating coil for controlling said relay contacts, said coil being connected to be energized by the voltage unbalance of said bridge circuit occasioned by a change in the back E. M. F. of said armature winding.

2. In an electrical control system, the combination with an electric motor having series-connected armature and field windings, of a tapped regulating resistance for controlling the flow of current to said motor, a relay having contacts which provide an intermittent short-circuit around said regulating resistance, a pair of series-connected resistances forming with said armature and field windings a bridge circuit, the portion of the regulating resistance between the tap and one end thereof being included in the bridge circuit in series between the armature winding and one of the resistances of said pair, and an operating coil for controlling said relay contacts, said coil being connected between the common junction of said series-connected resistances and the common junction of the armature and field windings.

3. In an electrical control system, the combination with an electric motor having series-connected armature and field windings, of a tapped regulating resistance for controlling the flow of current to said motor, a relay having contacts which provide an intermittent short-circuit around said regulating resistance, a pair of series-connected resistances forming with said armature and field windings a bridge circuit, said tapped regulating winding being included in said bridge circuit in series with and between the armature and field windings, and an operating coil for controlling said relay contacts, said coil being connected between the common junction of said series-connected resistances and the tap on said regulating resistance.

4. In combination with an electric motor having a series-connected armature winding and field winding, a source of electrical energy, an electric governor comprising a relay having an operating coil, a set of normally-closed contacts, an armature responsive to the voltage on said coil for opening and closing said contacts, a spring for biasing said contacts to a closed position, a pair of series-connected resistances forming with said armature and field windings a bridge circuit, the relay coil being connected in a circuit between the common junction of the resistances and the junction between the armature and field windings, a tapped regulating resistance connected in series with the armature winding and one side of said source, the other side of said source being connected to the junction between one of said series-connected resistances and the field winding, the other of said series-connected resistances being connected to the tap on the regulating resistance, a circuit of low impedance containing the relay contacts for shunting and unshunting said regulating resistance, and means for modifying the spring for changing the bias on said contacts.

5. In combination with an electric motor having a series-connected armature winding and field winding, an electric governor comprising a relay having an operating coil, a set of normally-closed contacts, an armature responsive to the voltage on said coil for opening and closing said contacts, an adjustable spring for biasing said contacts to a closed position, a pair of series-connected resistances forming with said armature and field windings a bridge circuit, a tapped regulating resistance included in said bridge circuit in series between said armature and field windings, the relay coil being connected in a circuit between the common junction of said series-connected resistances and the tap on said regulating resistance, a circuit of low impedance containing the relay contacts for shunting and unshunting said regulating resistance, and means for connecting a source of electrical energy between the common junction of one of said series-connected resistances and the field winding and the common junction of the other of said series-connected resistances and the armature winding.

6. In combination with an electric motor having a series-connected armature winding and field-winding, a voltage relay having an operating coil, a set of normally-closed contacts, a relay armature responsive to the voltage on said coil for opening and closing said contacts, an adjustable spring for biasing said contacts to a closed position, a pair of series-connected resistances forming with said armature and field windings a four-legged bridge circuit, a tapped regulating resistance having at least a part thereof inserted in the leg of said bridge circuit containing the armature winding, the relay coil being connected to be energized by the voltage unbalance of said bridge circuit, and a circuit of low impedance containing the relay contacts for shunting and unshunting said regulating resistance.

7. In an electrical control system, the combination with an electric motor having series-connected armature and field windings, of a tapped regulating resistance for controlling the flow of current to said motor, a voltage-responsive relay having contacts which provide an intermittent short-circuit around said regulating resistance, a pair of series-connected resistances forming with said armature and field windings a four-legged bridge circuit, said tapped regulating resistance being included in series at least partly in the bridge leg containing the armature winding, an operating coil for controlling said relay contacts, and a rectifier forming with said coil a series circuit connected to be energized by the voltage unbalance of said bridge circuit produced by a change in the back E. M. F. of said armature winding responsive to speed change in the motor.

No references cited.